United States Patent
Eisenhour

(10) Patent No.: US 7,836,715 B2
(45) Date of Patent: Nov. 23, 2010

(54) AIR CONDITIONER CONTROL LOGIC FOR COMPRESSOR NOISE AND TORQUE MANAGEMENT

(75) Inventor: Ronald Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 1236 days.

(21) Appl. No.: 10/943,940

(22) Filed: Sep. 20, 2004

(65) Prior Publication Data

US 2006/0059930 A1    Mar. 23, 2006

(51) Int. Cl.
*F25B 1/00* (2006.01)
(52) U.S. Cl. .......................... 62/228.1; 62/157; 62/158; 62/228.5; 62/296
(58) Field of Classification Search .................. 62/157, 62/158, 296, 228.1, 228.5; 471/12, 313; 417/12, 313

See application file for complete search history.

(56) References Cited

U.S. PATENT DOCUMENTS

| | | | | | |
|---|---|---|---|---|---|
| 4,128,854 | A | * | 12/1978 | Ruminsky | 361/22 |
| 4,307,775 | A | * | 12/1981 | Saunders et al. | 165/11.1 |
| 4,481,784 | A | * | 11/1984 | Elmslie | 62/133 |
| 4,919,195 | A | | 4/1990 | Tanino | |
| 5,214,930 | A | * | 6/1993 | Bendtsen | 62/115 |
| 5,415,004 | A | * | 5/1995 | Iizuka | 62/133 |
| 5,761,918 | A | * | 6/1998 | Jackson et al. | 62/181 |
| 5,832,990 | A | | 11/1998 | Eisenhour | |
| 5,995,889 | A | * | 11/1999 | Eisenhour | 701/36 |
| 6,272,871 | B1 | | 8/2001 | Eisenhour | |
| 6,655,165 | B1 | | 12/2003 | Eisenhour | |
| 2001/0049943 | A1 | * | 12/2001 | Nakamura et al. | 62/176.6 |

FOREIGN PATENT DOCUMENTS

JP    S58-116964 U    8/1983
JP    2002-120551 A    4/2002

\* cited by examiner

*Primary Examiner*—Frantz F Jules
*Assistant Examiner*—Azim Rahim
(74) *Attorney, Agent, or Firm*—Global IP Counselors, LLP

(57) ABSTRACT

An air conditioner has a controller that controls the operation of a refrigerant circuit that has a compressor, a condenser, an expansion valve or orifice tube, and an evaporator. The condenser receives a compressed refrigerant from the compressor and condenses the refrigerant to either a liquid phase or a saturated liquid-vapor phase. The condensed refrigerant is then passed through the expansion valve or orifice tube to expand the refrigerant and to delivery the refrigerant to the evaporator. When the compressor is first started, various sounds and vibrations are created that may be unpleasant to humans. Also, if the engine is cold, then the compressor may have liquid refrigerant that can increase the torque needed to start the compressor. The controller pulses the compressor between ON and OFF operating states to reduce or eliminate these sounds and/or manage the start up torque of the compressor.

13 Claims, 7 Drawing Sheets

AIR CONDITIONER CONTROL LOGIC FOR COMPRESSOR NOISE AND TORQUE MANAGEMENT

BACKGROUND OF THE INVENTION

1. Field of the Invention

The present invention generally relates to an air conditioner. More specifically, the present invention relates to an air conditioner control system for reducing refrigerant noise and for managing torque, during initial engagement of a compressor of the air conditioner.

2. Background Information

A typical automobile air conditioner includes a compressor, a condenser, an expansion valve or orifice tube, and an evaporator. The compressor compresses a cool vapor-phase refrigerant (e.g., Freon, R134a) to heat the same, resulting in a hot, high-pressure vapor-phase refrigerant. This hot vapor-phase refrigerant runs through a condenser, typically a coil that dissipates heat. The condenser condenses the hot vapor-phase refrigerant into liquid refrigerant. The liquid refrigerant is throttled through an expansion valve, which evaporates the refrigerant to a cold, low-pressure saturated liquid-vapor-phase refrigerant. This cold saturated liquid-vapor-phase refrigerant runs through the evaporator, typically a coil that absorbs heat from the air fed to the passenger compartment.

When the compressor of an air conditioner is first started, the rapid pressure changes that occur with the compressor cycling from OFF to ON can create various sounds and vibrations that may be unpleasant to humans. The origin of these sounds and vibrations include, but not limited to, purging liquid from the compressor (known as slugging) and the refrigerant passing through the expansion valve or orifice tube. Also, if the engine is cold and liquid refrigerant is present in the compressor then this slugging of the refrigerant can increase the torque needed to start the compressor. This increase in the compressor torque requirement can have an adverse affect on the performance of the vehicle.

In view of the above, it will be apparent to those skilled in the art from this disclosure that there exists a need for an improved air conditioner control system that is quieter and/or easier to operate at start up. This invention addresses this need in the art as well as other needs, which will become apparent to those skilled in the art from this disclosure.

SUMMARY OF THE INVENTION

The present invention relates to an air conditioner comprising a heat removal device, an evaporator, a compressor and a controller. As mentioned above, it has been discovered that after engagement of the compressor of the air conditioner refrigerant noises occur. For example, these refrigerant noises can be due to purging liquid from the compressor (e.g., slugging) and/or due to refrigerant passing through the expansion valve or orifice tube. These sounds may include, but are not limited to, a bang, a knock, a clunk, a clang, a hissing etc., and may also include multiple variations, combinations, and repetitions thereof.

One object of the present invention is to provide an air conditioner with control logic that is quieter and/or easier to operate at start up. In other words, the air conditioner of the present invention was basically contrived to avoid to the greatest extent possible the adverse effects of the compressor being started, e.g., minimizes the refrigerant noises at compressor start up and/or decrease the compressor torque requirements due to slugging at compressor start up.

In view of the forgoing, an air conditioner is provided that basically comprises a heat removal device, an evaporator, a compressor and a controller. The heat removal device is configured to receive a refrigerant in a compressed state and remove heat from at least a portion of the refrigerant. The evaporator is in fluid communication with the heat removal device to receive the refrigerant, and is configured to evaporate at least a portion of the refrigerant. The compressor is in fluid communication with the evaporator, and configured to compress the refrigerant and deliver the refrigerant in the compressed state to the heat removal device. The controller is operatively coupled to the compressor to selectively operate the compressor in response to a compressor request signal. The controller is configured to cycle the compressor between at least one ON operating state for a period of time and at least one OFF operating state for a prescribed period of time and then operate the compressor for an additional period of time.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
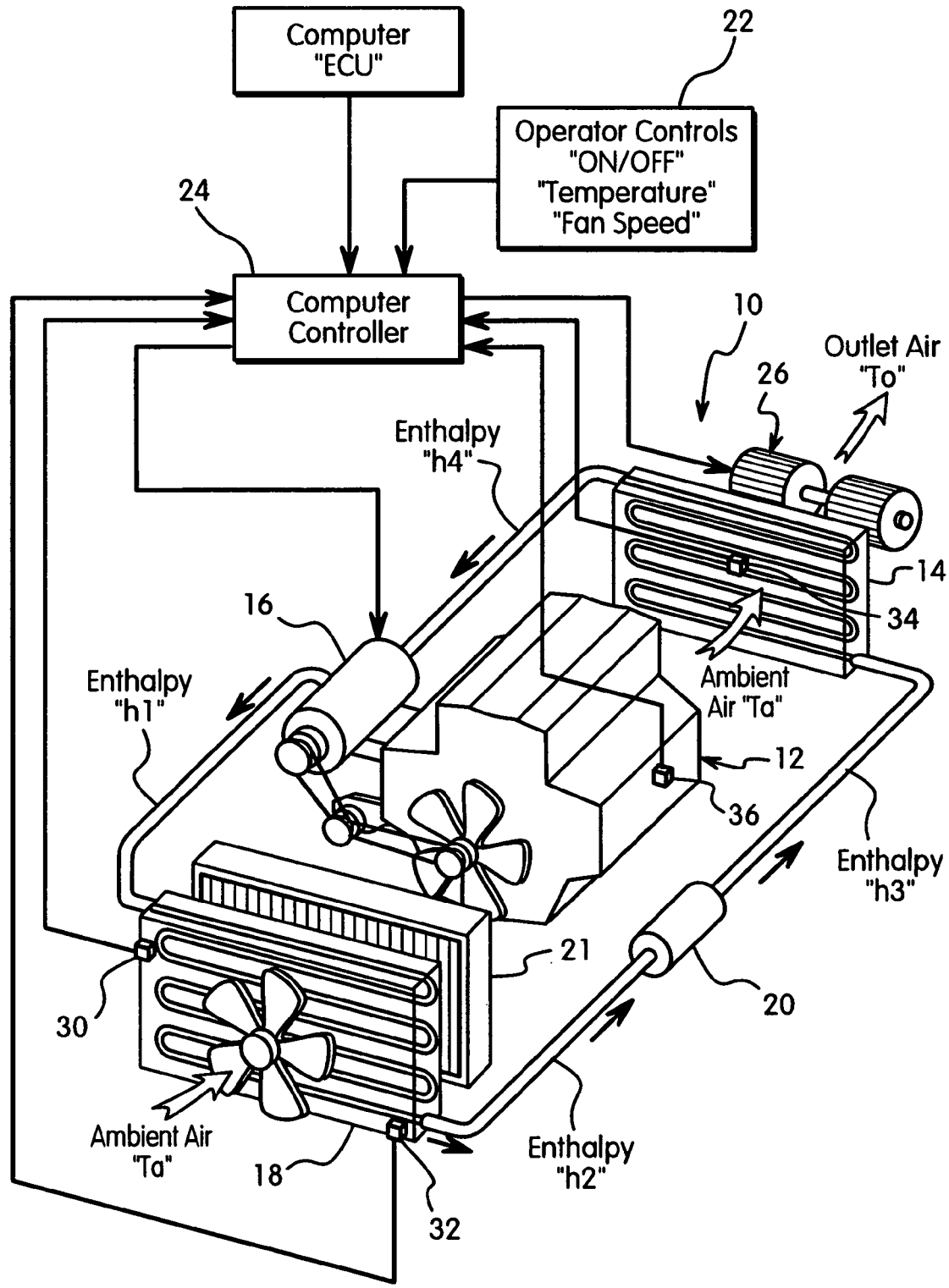
FIG. 1 is a simplified schematic diagram of a portion of vehicle equipped with a refrigerant circuit in accordance with a first embodiment of the present invention.

Referring initially to FIG. 1, an air conditioner 10 is illustrated in accordance with a first embodiment of the present invention. The air conditioner 10 according to the present invention is particularly suitable for an automobile or other passenger vehicle (such as but not limited to a car, an SUV, a minivan, a station wagon, a pick-up truck, etc.,) as well as refrigeration systems for homes and industrial use. In the illustrated embodiment, the air conditioner 10 is driven by a vehicle engine 12 in a conventional manner. Basically, the air conditioner 10 has a refrigerant circuit that includes an evaporator 14, a compressor 16 with an electromagnetic clutch, a condenser 18 and an expansion valve or orifice 20. Typically, the condenser 18 is located in front of a radiator 21 that cools the engine coolant of the engine 12. These components 14, 16, 18 and 20 are conventional components that are well known in the air conditioning field. Since these components 14, 16, 18 and 20 are well known in the air conditioning field, the structures of the components 14, 16, 18 and 20 will not be discussed or illustrated in detail herein.

The compressor 16 is fluidly connected to the condenser 18 via a refrigerant pipe or conduit. The evaporator 14 is also fluidly connected to the compressor 16 via a refrigerant pipe or conduit. The expansion valve 20 is fluidly connected to the condenser 18 via a refrigerant pipe or conduit, and to the evaporator 14 by a refrigerant pipe or conduit. Thus, a refrigerant (e.g., Freon, R134a) is circulated through the refrigerant circuit of the air conditioner 10 to cool the passenger compartment or vehicle cabin.

In particular, the compressor 16 receives and compresses a cool vapor-phase refrigerant from the evaporator 14. The compressor 16 is energizing or de-energizing the electromagnetic clutch of the compressor 16. The compression action heats the refrigerant, resulting in a hot, high-pressure vapor-phase refrigerant. This hot vapor-phase refrigerant is then fed through the condenser 18, such as an air-cooled coil that dissipates heat. The condenser 18 condenses the hot vapor-phase refrigerant into a liquid-phase refrigerant or a saturated liquid-vapor-phase refrigerant. In the preferred embodiment of the present invention, the condenser 18 condenses the refrigerant by air cooling. Thus, the condenser 18 of the preferred embodiment is a heat removal device. The condensed refrigerant is then delivered through the expansion valve 20, which expands the liquid-phase or saturated liquid-vapor-phase refrigerant to a cold, low-pressure liquid-vapor-phase refrigerant having a higher vapor content. Thus, the high pressure refrigerant passes through the expansion valve 20 so as to be throttled to a low pressure and temperature. The cold liquid-vapor-phase refrigerant (having a higher vapor content than the refrigerant exiting the condenser) runs through the evaporator 14, typically a coil that absorbs heat from and cools the air delivered to the passenger compartment or vehicle cabin.

The operations of the air conditioner 10 are controlled by a set of operator controls 22 that are located in the cabin of the vehicle. The operator controls 22 typically will include an ON/OFF switch, a temperature control and a blower of fan speed control. Once the operator turns on the air conditioner 10, a control signal is received by a computer controller 24 of the computer or engine control unit ECU. In other words, the computer controller 24 operates the air conditioner 10 in accordance with the settings of the operator controls 22.

The computer controller 24 basically controls the operation of the air conditioner 10 by operating the compressor 16 between an ON operating state and an OFF operating state. For example, the computer controller 24 selectively activates and deactivates a compressor clutch of the compressor 16 to switch between the ON operating state and the OFF operating state. More specifically, the computer controller 24 selectively activates the compressor 16 between the ON and OFF operating states based on various control signals so as to substantially maintain the passenger compartment or vehicle cabin at a prescribed temperature setting that was set by the operator controls 22. Moreover, the computer controller 24 selectively controls a fan or blower 26 at a prescribed fan speed in accordance with a fan speed setting that was set by the operator controls 22.

In the illustrated embodiment, the normal control logic of the air conditioner 10 is based on control signals from one or more of the following sensors: an outside air temperature sensor 30, a refrigerant pressure transducer or sensor 32, an evaporator temperature sensor 34, and an engine coolant temperature sensor 36. The outside air temperature sensor 30 is configured and arranged to detect the outside air temperature Ta, and output a signal to the computer controller 24 that is indicative of the outside air temperature Ta. Preferably, the outside air temperature sensor 30 is disposed in front of the condenser 18. The refrigerant pressure transducer or sensor 32 is configured and arranged to detect the refrigerant pressure P inside the condenser 18, and output a signal to the computer controller 24 that is indicative of the refrigerant pressure P. The evaporator temperature sensor 34 is configured and arranged to detect the evaporator temperature Te, and output a signal to the computer controller 24 that is indicative of the evaporator temperature Te. The engine coolant temperature sensor 36 is configured and arranged to detect the temperature of the engine coolant Tw, and output a signal to the computer controller 24 that is indicative of the temperature of the engine coolant Tw.

The precise of control of the air conditioner 10 during normal control operations is not important to the present invention. Thus, the normal control logic of the air conditioner 10 will only be briefly discussed below in a simplified manner with respect to the flow chart illustrated in FIG. 4. Rather, the description of the present invention will focus on the control logic or operations during initial engagement of the compressor 16 of the air conditioner 10 for reducing refrigerant noise and for managing compressor torque. The control logic or operations during initial engagement of the compressor 16 of the air conditioner 10 is controlled by the computer controller 24.

The computer controller 24 preferably includes a microprocessor and an air conditioner control program that controls the compressor 16 as discussed below. The computer controller 24 can also include other conventional components such as an input interface circuit, an output interface circuit, and storage devices such as a ROM (Read Only Memory) device and a RAM (Random Access Memory) device. The microprocessor of the computer controller 24 is programmed to control the air conditioner 10. The memory circuit stores processing results and control programs for controlling the operation of the compressor 16. The computer controller 24 is operatively coupled to the engine control unit ECU in a conventional manner. The internal RAM of the computer controller 24 stores statuses of operational flags and various control data. The internal ROM of the computer controller 24 stores the control logic for various operations of air conditioner 10. It will be apparent to those skilled in the art from this disclosure that the precise structure and algorithms for the computer controller 24 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Basically, the computer controller 24 is configured and arranged to initially cycle the compressor 16 between at least one ON operating state for a predetermined period of time and at least one OFF operating state for a prescribed period of time, and then subsequently operate the compressor 16 using normal logic for an additional period of time, i.e., until the cabin temperature has reached the temperature setting that was set by the operator utilizing the operator controls 22. Preferably, the computer controller 24 includes a compressor ON timer that is configured to at least measure the time that the compressor 16 is in the ON operating state and a compressor OFF timer that is configured to at least measure the time that the compressor 16 is in the ON operating state.

In the full time logic, this cycling of the compressor 16 by the computer controller 24 occurs each and every time the compressor 16 is started. Preferably, the computer controller 24 produces a compressor request signal to start the compressor 16 once the air conditioner 10 has been turned ON. In the illustrated embodiment, when the compressor request signal is issued, a compressor request flag CompReq is set to "1" to represent that the compressor 16 has been set to an ON operating state. When the compressor request signal has been sent to turn OFF the compressor 16, then the compressor request flag CompReq is set to "0" to represent that the compressor 16 has been set to an OFF operating state.

Depending upon the particular application, the computer controller 24 can be set to repeatedly cycle the compressor 16 between the ON operating state and the OFF operating state as needed and/or desired. This cycling of the compressor 16 between the ON and OFF operating states reduces the refrigerant noises occurring during start up of the compressor 16, as well as reduces the torque load on the engine 12 that may occur due to slugging of the compressor 16. This control logic of the present invention is preferably run in a timing loop such that other routines can be conducted without waiting.

In one possible embodiment of the present invention, the compressor 16 is turned ON for approximately one second and then turned OFF for one second before the compressor 16 is continuously run until the evaporator 14 reaches the desired temperature needed for cooling the vehicle cabin in response to the temperature setting by the operator controls 22. Of course, it will apparent to those skilled in the art from this disclosure that the cycling times can be extended or shortened. Preferably, the entire cycling of the compressor 16 between the ON and OFF operating states occurs within approximately three or four seconds. Of course, these prescribed time periods can be extended depending upon the applications. Moreover, the prescribed period for the ON and OFF operating states can be varied based on the ambient temperature. For example, the computer controller 24 can be configured to increase the length of the prescribed time period for the OFF operating state when the ambient temperature becomes lower, while maintaining the prescribed time period for the ON operating state constant or varying the length of the prescribed time period for the ON operating state as needed and/or desired for the particular situation.

Figure 2:
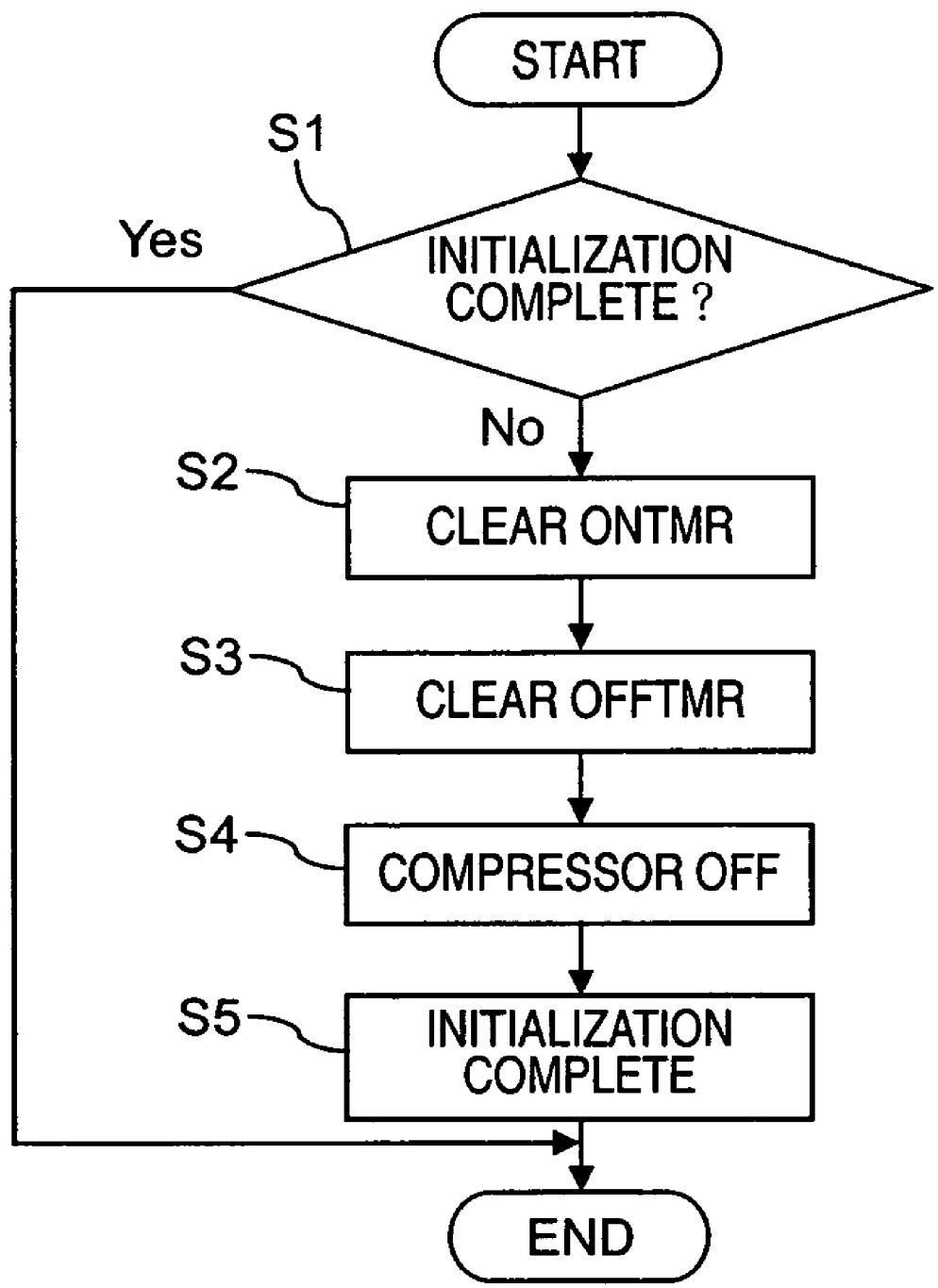
FIG. 2 is a first flowchart showing an initialization control logic or operations executed by the engine control unit or computer for a full time pulsing logic in accordance with the first embodiment of the present invention.

The control operations executed by the computer controller 24 will now be described with reference to the functional block diagrams or flow charts of FIGS. 2 to 7. Many of the functions described below are functions that are preferably executed using software processing. The control routine of FIG. 2 is only executed shortly after the engine 12 is started. The control routines of FIGS. 3 and 7, on the other hand, are periodically executed in a cyclic manner at a prescribed fixed time interval when the engine 12 is operating in accordance with certain predetermined operating conditions, e.g., when the air conditioner 10 has been turned ON.

Referring first to FIG. 2, a first flowchart is illustrated showing an initialization control logic executed by the computer controller 24 for a full time pulsing logic in accordance with the first embodiment of the present invention. The initialization control logic of FIG. 2 is conducted shortly after the engine is started, but prior to starting the compressor 16. Preferably, the initialization control logic is executed by the computer controller 24 each time the engine 12 is started. This control logic is preferably suspends all other control processes relating to the compressor 16, until the compressor 16 has been cycled between the ON and OFF operating states at least once.

In step S1 of FIG. 2, the computer controller 24 is configured to determine if the initialization control logic has been already completed. If the initialization control logic has not been completed, then the computer controller 24 proceeds to step S2. If the initialization control logic has been already completed, then the processing ends.

In step S2, the computer controller 24 is configured to clear the compressor ON timer (i.e., set ONTMR=0). Thus, the compressor ON timer will start counting from zero when the main control routine is executed by the computer controller 24 as explained below.

Next in step S3, the computer controller 24 is configured to clear the compressor OFF timer (i.e., set ONTMR=0). Thus, the compressor OFF timer will start counting from zero when the main control routine is executed by the computer controller 24 as explained below.

In step S4, the computer controller 24 is configured to set the compressor 16 to the OFF operating state (i.e., set CompReq=0) such that the operation of the compressor 16 is initially delayed until the compressor 16 has been cycled through at least one ON operating state and at least one OFF operating state.

In step S5, the computer controller 24 sets a flag indicating the initialization has been completed such that subsequent processing of the initialization control logic ends, until the engine 12 is turned off and restarted.

Figure 3:
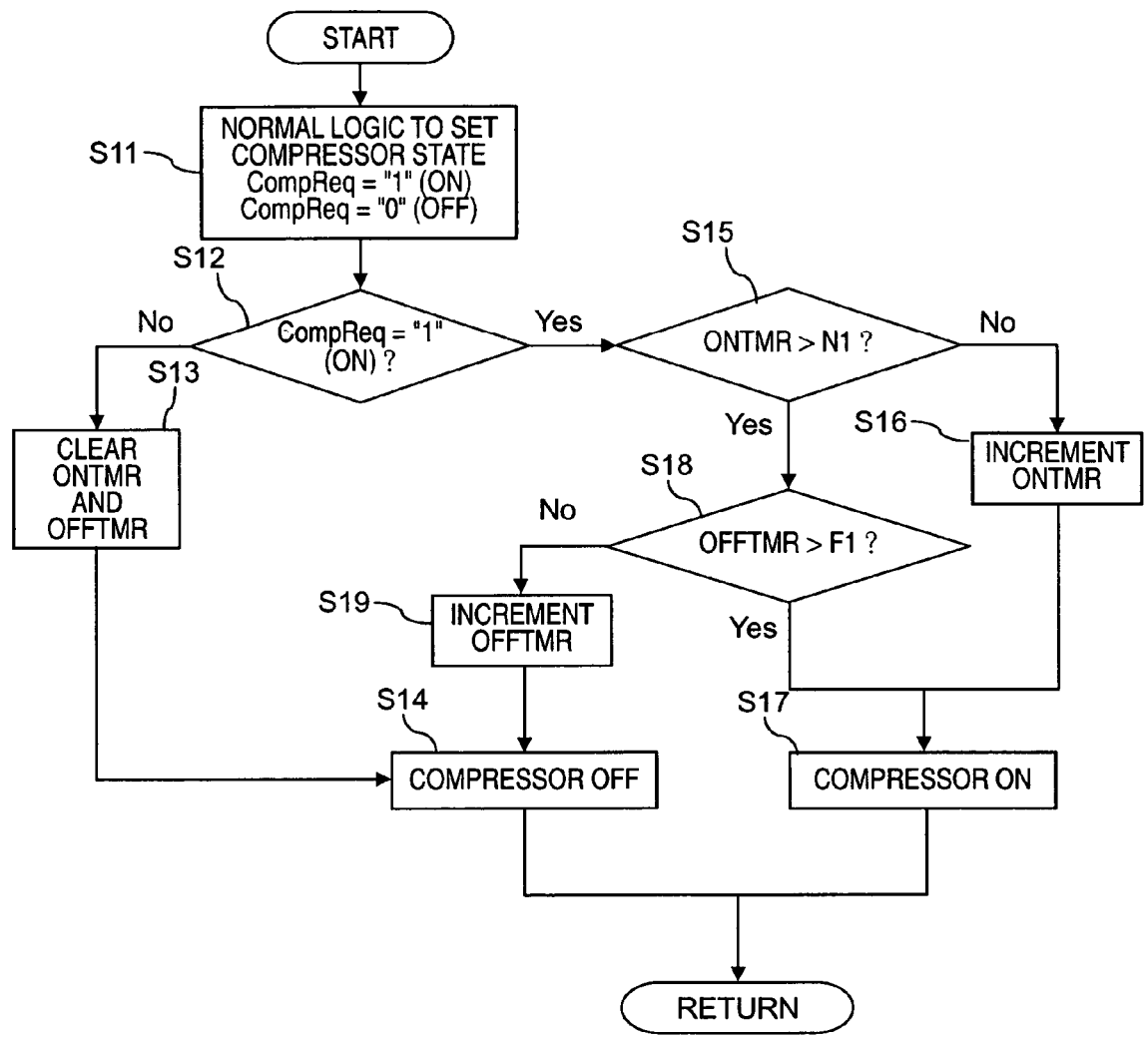
FIG. 3 is a second flowchart showing a preferred full time pulsing control logic or operations executed by the computer in accordance with the first embodiment of the present invention.

Referring now to FIG. 3, a flowchart is illustrated showing a preferred full time pulsing control logic executed by the computer controller 24 in accordance with the first embodiment of the present invention. The full time pulsing control logic of FIG. 3 is conducted after the initialization control logic has been completed.

In step S11, the computer controller 24 executes normal control logic to set the compressor request flag CompReq to "1", or "0". The normal control logic will be explained later with reference to FIG. 4.

In step S12, the computer controller 24 is configured to determine if the compressor request flag CompReq is set to the ON operating state (CompReq="1") or if the compressor request flag CompReq is set to the OFF operating state (CompReq="0"). If the compressor request flag CompReq is set to "0", then the control process proceeds to step S13, because the operation of the compressor 16 is not necessary at this time.

In step S13, the computer controller 24 is configured to clear the compressor ON and OFF timers ONTMR and OFFTMR. In other words, the times ONTMR and OFFTMR counted by the compressor ON and OFF timers are both set to "0". Then, the computer controller 24 proceeds to step S14.

In step S14, the computer controller 24 turns OFF the compressor 16 if the compressor 16 is not already in the OFF operating state.

However, in step S12, if the compressor request flag CompReq is set to "1", then there is a compressor request to turn ON the compressor 16 to cool down the evaporator 14. Thus, the computer controller 24 proceeds to step S15.

In step S15, the computer controller 24 is configured to determine if a prescribed amount of time N1 has elapsed since the compressor 16 has been activated. In other words, in step S15, the computer controller 24 determines if the compressor 16 has been in the ON operating state for a prescribed period of time N1 as measured by the compressor ON timer. In particular, in step S15, the computer controller 24 compares the elapsed time ONTMR counted by the ON timer to the prescribed period of time N1. Initially, the elapsed time ONTMR is set to "0" due to the initialization control logic or due to step S13. This prescribed period of time can be determined using experimental data for the particular situation. In the case where the engine has just been started and the air conditioner has been turned ON, the computer controller 24 will determine that the elapsed time ONTMR has not exceeded the prescribed period of time N1, because the elapsed time ONTMR counted by the ON timer was previously set to "0". Thus, the computer controller 24 will proceed to step S16.

In step S16, the computer controller 24 increments the elapsed time ONTMR by a predetermined amount. Preferably, the value of the prescribed period of time N1 is directly correlated to the processing time to run the full time control logic. In other words, each increment preferably corresponds to the amount of time that has elapsed since the computer controller 24 last compared the elapsed time ONTMR counted by the ON timer to the prescribed period of time N1 in step S15. For example, this entire routine might be executed once every 0.1 second. If this is the case, then each increment of the ON timer is equivalent to 0.1 second in step S16.

Once the elapsed time ONTMR is incremented in step S16, the computer controller 24 proceeds to step S17. In step S17, the compressor 16 is turned ON. In particular, the compressor 16 includes an electromagnetic clutch that is engaged by the computer controller 24 to operate the compressor 16.

The processing by the computer controller 24 returns to the beginning of this main routine such that the computer controller 24 continues to execute steps S11, S12, S15, S16, and S17 until the elapsed time ONTMR has been incremented such that the prescribed period of time N1 has elapsed. In other words, the computer controller 24 determines in step S15 that the elapsed time ONTMR counted by the ON timer has exceeded the prescribed period of time N1. Thus, the computer controller 24 proceeds to step S18.

In step S18, the computer controller 24 determines if the elapsed time OFFTMR counted by the compressor OFF timer has reached or exceeded a prescribed amount of time, i.e., if a prescribed amount of time F1 has elapsed since the compressor 16 has been turned OFF. Initially, the elapsed time OFFTMR is set to "0" by step S3 of the initialization control logic before the compressor 16 is first started or by step S13 after the compressor request flag CompReq is set to the OFF operating state (CompReq="0"). Accordingly, at least initially, the computer controller 24 proceeds to step S19 after the compressor 16 is first started.

In step S19, the computer controller 24 increments the elapsed time OFFTMR by a prescribed amount of time. Similar to the incrementing of the elapsed time ONTMR, the prescribed amount of time for incrementing the elapsed time OFFTMR counted by the OFF timer is preferably based on the execution time of the computer controller 24 to complete a complete loop from the prior comparison between the elapsed time OFFTMR counted by the elapsed time OFFTMR and the prescribed amount of time F1 in step S18.

Once the elapsed time OFFTMR has been incremented in step S19, the computer controller 24 proceeds to step S14 to deactivate the compressor 16 if it has not already been deactivated. Accordingly, the computer controller 24 continuously executes steps S11, S12, S15, S18, S19, and S14, until the elapsed time OFFTMR exceeds the prescribed amount of time F1. If the elapsed time OFFTMR exceeds the prescribed amount of time F1, then the computer controller 24 proceeds to step S17, where the computer controller 24 activates the compressor 16.

Once both the elapsed time ONTMR exceeds the prescribed amount of N1 and the elapsed time OFFTMR exceeds the prescribed amount of F1, then the compressor 16 runs continuously until the evaporator temperature Te of the evaporator 14 exceeds a predetermined threshold for cooling the vehicle cabin. More particularly, the control logic shown in FIG. 4 is continuously executed so long as the air conditioner remains ON.

Figure 4:
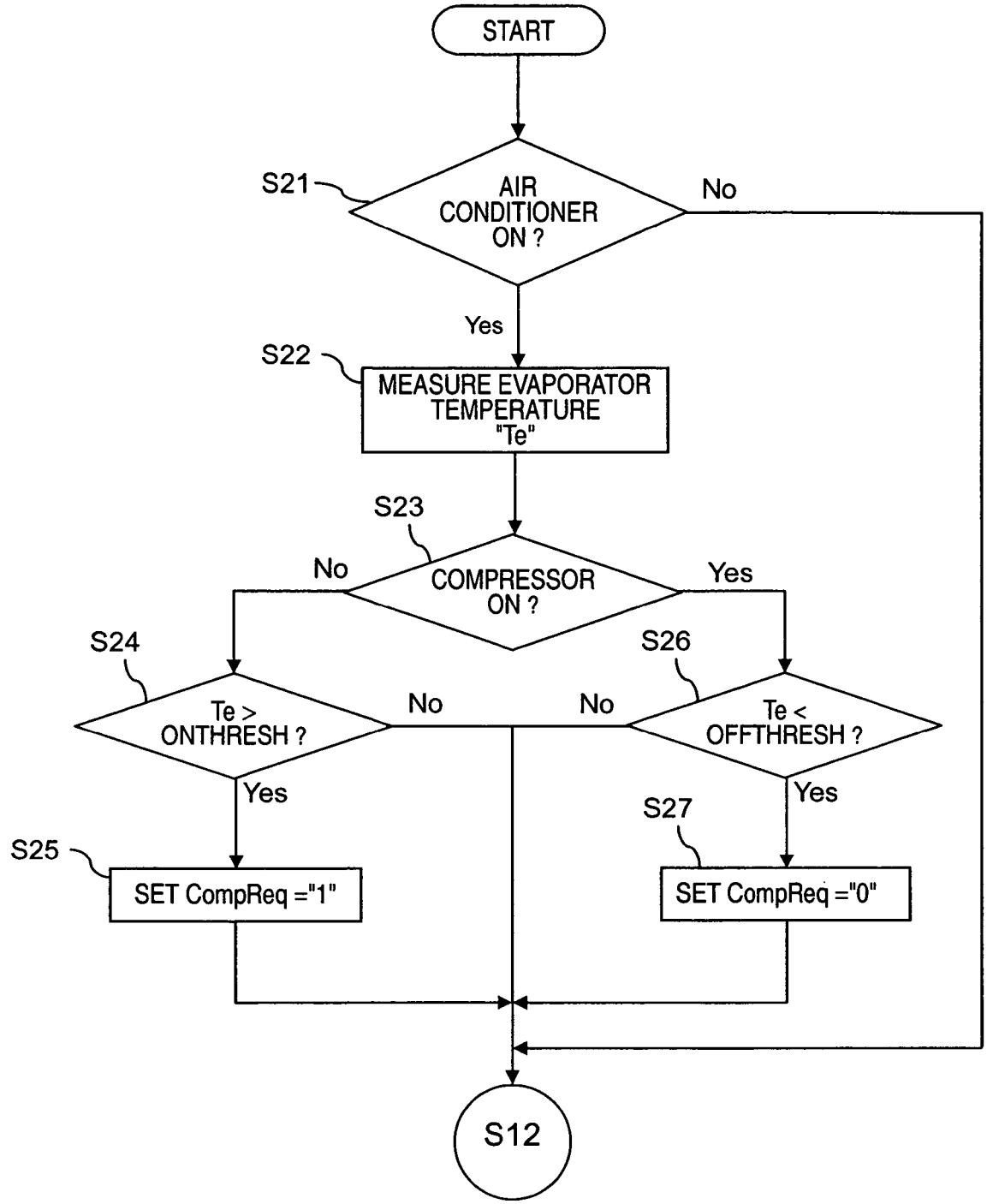
FIG. 4 is a third flowchart showing an exemplary normal control logic or operations executed by the computer in accordance with the first embodiment of the present invention.

Referring now to FIG. 4, an exemplary normal control logic is illustrated for controlling the compressor 16 to substantially maintain the vehicle cabin temperature that has been set by the operator controls 22. Of course, it will be apparent to those skilled in the art from this disclosure that other control programs can be utilized for maintaining cabin temperature as needed and/or desired without departing from the scope of the present invention.

In step S21, first, the computer controller 24 determines if the air conditioner 10 has been turned ON. In other words, the computer controller 24 determines if the operator has turned the ON/OFF switch of the operator controls 22 to an ON position, and thus, the operator has requested air conditioning for the vehicle cabin. If the computer controller 24 determines that the air conditioner 10 has been turned ON, then the computer controller 24 proceeds to step S22.

In step S22, the computer controller 24 is configured to measure the evaporator temperature Te of the evaporator 14. In particular, the computer controller 24 receives a control signal from the evaporator temperature sensor 34 that is indicative of the current evaporator temperature Te, and then the computer controller 24 proceeds to step S23.

In step S23, the computer controller 24 determines whether the compressor 16 is currently in an ON operating state. When the air conditioner 10 is initially turned ON, the compressor 16 is initially maintained in the OFF operating state due to step S4 of the initialization control logic. Thus, initially, the computer controller 24 proceeds from step S23 to step S24.

In step S24, the computer controller 24 determines if the evaporator temperature Te has exceeded a prescribed ON temperature threshold value ONTHRESH for the evaporator 14. In other words, the computer controller 24 determines whether the evaporator temperature Te is too warm and the compressor should be turned ON to cool down the evaporator 14. Of course, if the air conditioner 10 has just been turned ON, the evaporator temperature Te will most likely be greater than the prescribed ON temperature threshold value ONTHRESH. Thus, the computer controller 24 will at least initially proceed to step S25.

In step S25, the compressor request flag CompReq is set to 1 (CompReq="1") so that the compressor 16 will be activated as the processing continues. Thus, the computer controller 24 proceeds to step S12, discussed above, to determine whether the compressor request flag CompReq is set to "0" or "1". After the initially cycling of the compressor 16, when the evaporator temperature Te of the evaporator 14 was determined to be greater than the prescribed ON temperature threshold value ONTHRESH in step S24 and the compressor request flag CompReq was set to 1 in step S25, the computer controller 24 proceeds from step S12 to steps S15, S18 and S16, where the compressor 16 is turned ON. Thus, the computer controller 24 then continuously loops through the control loops of FIGS. 3 and 4 until the evaporator temperature Te exceeds the prescribed OFF temperature threshold value OFFTHRESH for the evaporator 14 as explained below.

On the other hand, in step S24, if the evaporator temperature Te is less than the prescribed ON temperature threshold value ONTHRESH for the evaporator 14, then the computer controller 24 proceeds directly to steps S12, S13 and S14, such that the elapsed times ONTMR and OFFTMR are cleared and the compressor 16 is maintained in the OFF operating state.

Referring back to step S23, if the compressor 16 is currently in the ON operating state, then the computer controller 24 proceeds from step S23 to step S26 for when to turn OFF the compressor 16.

In step S26, the computer controller 24 determines if the evaporator temperature Te is below the prescribed OFF temperature threshold value OFFTHRESH for the evaporator 14. If the evaporator temperature Te has fallen below the prescribed OFF temperature threshold value OFFTHRESH, then the computer controller 24 proceeds to step S27.

In step S27, the computer controller 24 sets the compressor request flag CompReq to 0 (CompReq="0"). Then, the computer controller 24 proceeds to step S12 of the flow chart shown in FIG. 3. Since the compressor request flag CompReq has been set to "0", the computer controller 24 proceeds from step S12 to S14 where the ONTMR and the OFFTMR are both cleared or set to "0" and where the compressor 16 is deactivated to the OFF operating state. The compressor 16 will remain in the OFF operating state, until the evaporator temperature Te rises above the prescribed ON temperature threshold value ONTHRESH for the evaporator 14, which is determined in step S24.

Thus, the computer controller 24 continues to execute the control logic of FIGS. 3 and 4 until the air conditioner 10 has been turned OFF by the operator controls 22.

Figure 5:
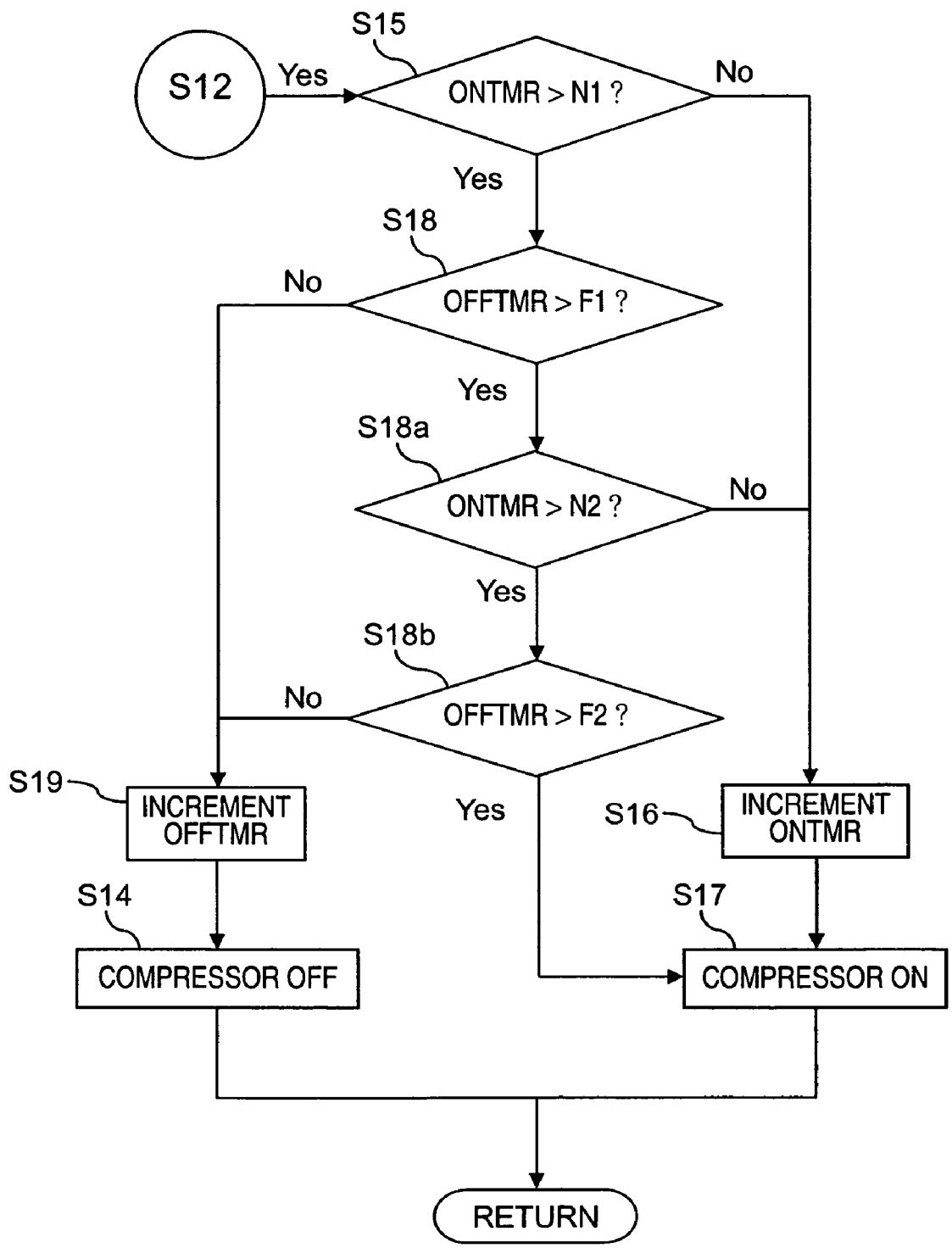
FIG. 5 is a fourth flowchart showing a modified pulsing control logic or operations executed by the computer as part of the pulsing control logic shown in FIG. 3.

Referring now to FIG. 5, a modified full time control logic is illustrated in accordance with the present invention. Basically, the control logic of FIG. 5 adds new steps S18a and S18B to the control logic of FIG. 3. Accordingly, only steps S18a and S18b will be discussed.

Basically, the control logic shown in FIG. 5 adds an additional compressor ON/OFF cycle to the control logic of FIG. 3. In other words, after the prescribed times N1 and F1 has both elapsed (ONTMR>N1 and OFFTMR>F1), the computer controller 24 first determines whether or not the elapse time ONTMR has exceeded a second prescribed period of time N2 in step S18a for reactivating the compressor 16 for the second prescribed period of time N1. Next, the computer controller 24 determines whether or not the elapse time OFFTMR has exceeded a second prescribed period of time F2 in step S18b for deactivating the compressor 16 for the second prescribed period of time F1.

In other words, after the elapse times ONTMR and OFFTMR have exceeded the first prescribed values N1 and F1, then the computer controller 24 first determines if the second prescribed compressor ONTMR has exceeded the prescribed time N2. If the time ONTMR counted by the ON timer has not exceeded the prescribed time period N2, then the computer controller 24 proceeds to step S16 to increment the elapse time ONTMR by a prescribed amount.

Then, the computer controller 24 proceeds to step S17 to reactivate the compressor 16 for a second time. The control logic continues to loop through steps S18a, steps S16 and S17 until the elapse time ONTMR counted by the ON timer exceeds the prescribed time N2. Once the prescribed time N2 has been exceeded, then the computer controller 24 proceeds to step S18b.

In step S18b, the computer controller 24 determines if the elapse time OFFTMR counted by the OFF timer has exceeded the second prescribed time F2. If not, the computer controller 24 proceeds to step S19 where the elapse time OFFTMR is incremented. Then the computer controller 24 proceeds to step S14 where the compressor 16 is deactivated, if not previously deactivated. The control loop continues to process through steps S18b, S19, and S14 to maintain the compressor 16 in the OFF operating state until the elapse time OFFTMR exceeds the prescribed time F2. Once the prescribed time F2 has been exceeded, the processing proceeds to step S17 where the compressor 16 is reactivated. Now, the computer controller 24 operates the cycling of the compressor 16 according to the normal control logic of FIG. 4.

It will be apparent to those skilled in the art from this disclosure that additional cycles can be added for pulsating the compressor 16 between ON and OFF operating states by adding additional steps similar to steps S18a and S18b that include larger prescribed times N3, N4, ... and F3, F4, ... that are counted by the ON and OFF timers, respectively.

Figure 6:
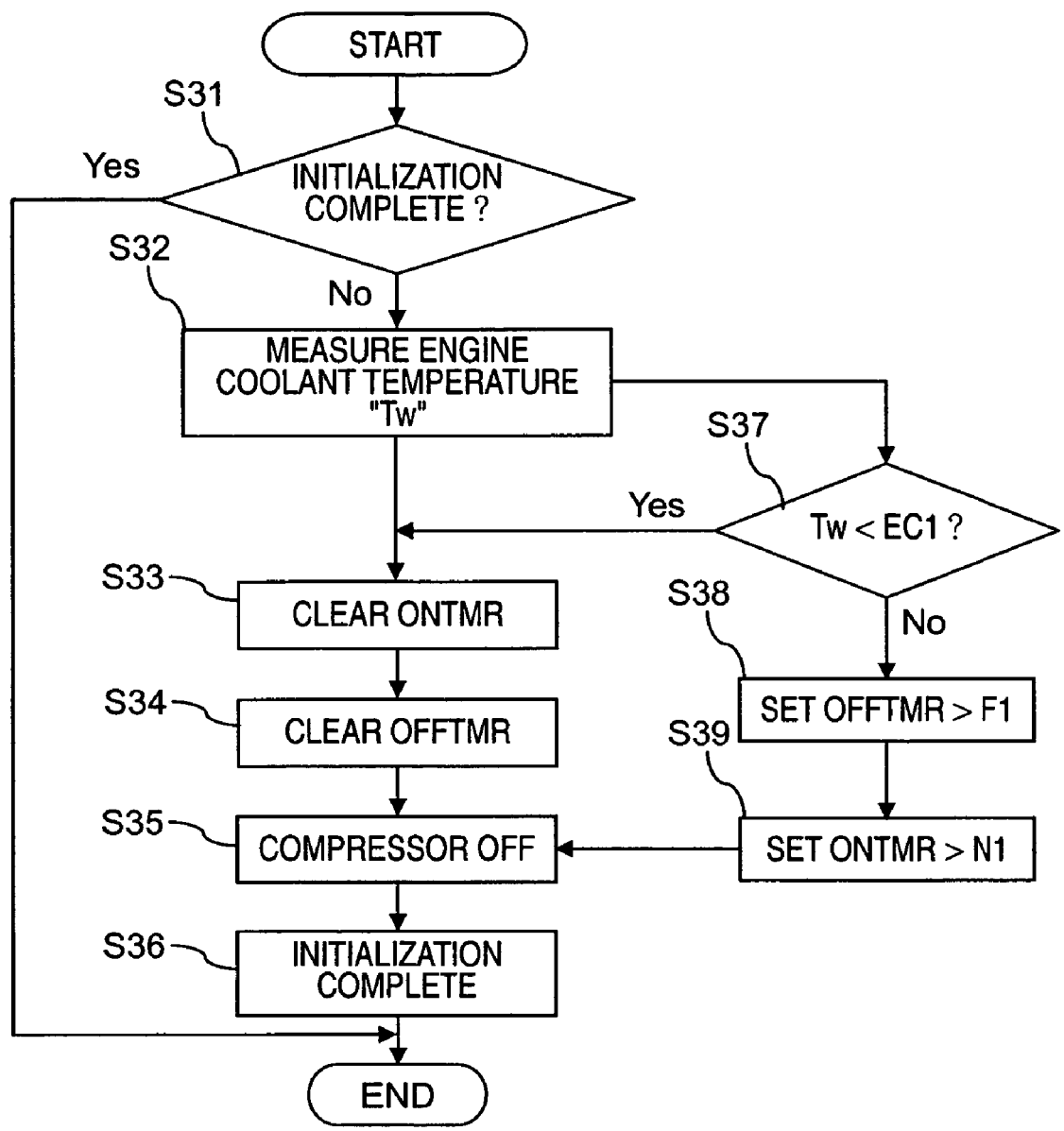
FIG. 6 is a fifth flowchart showing an initialization control logic or operations executed by the engine control unit or computer for a one time pulsing logic in accordance with a second embodiment of the present invention.
Figure 7:
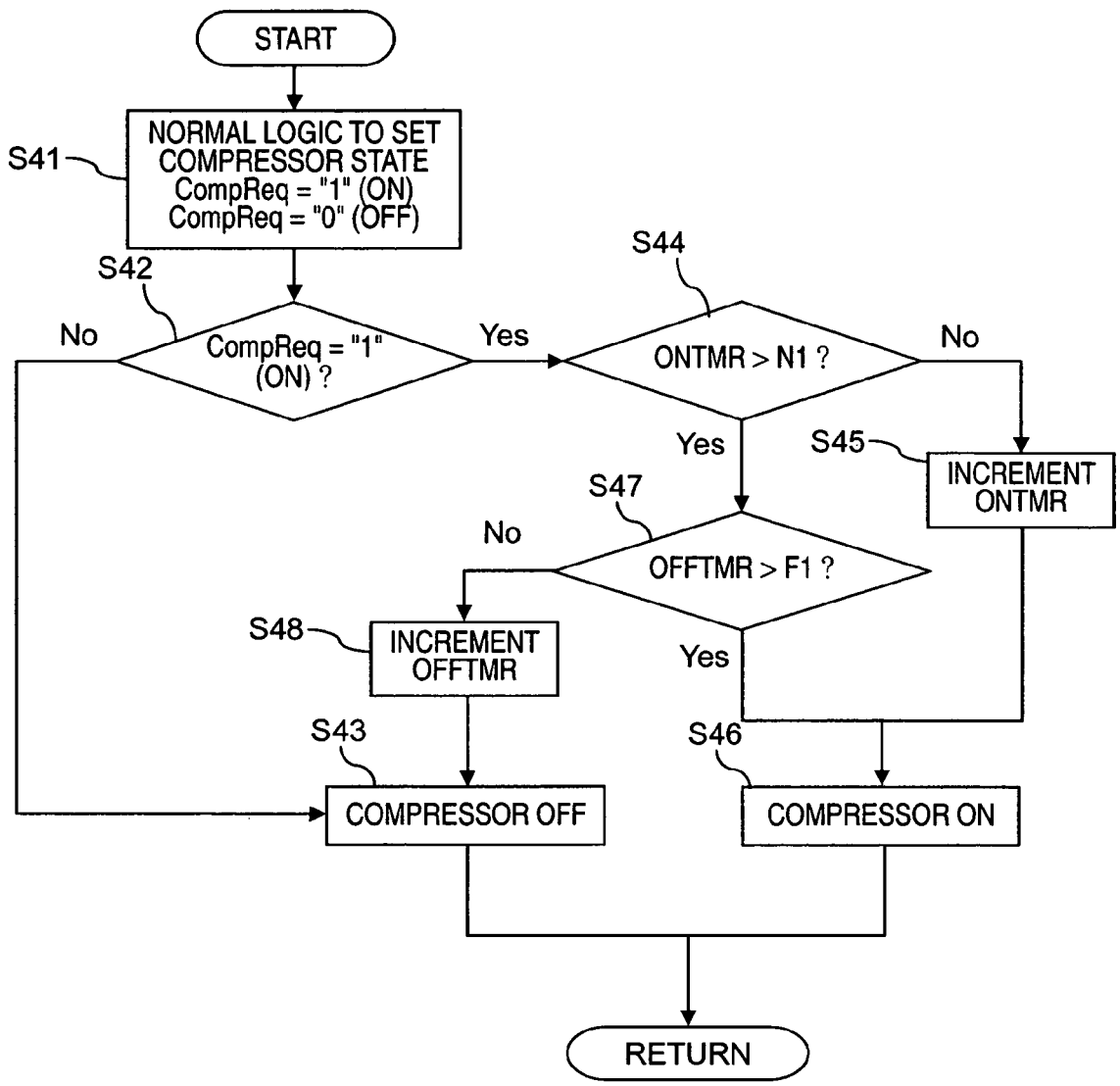
FIG. 7 is a sixth flowchart showing a one time pulsing control logic or operations executed by the computer in accordance with the first embodiment of the present invention.

Now referring to FIGS. 6 and 7, a one time pulsing logic in accordance with a second embodiment of the present invention will now be discussed. The control logic illustrated in FIGS. 6 and 7 are utilized separately from the prior full time pulsing logic. The control logic of FIGS. 6 and 7 is directed to minimize the noise due to slugging and/or manage the torque load on the engine due to the liquid refrigerant in the compressor 16. Thus, after, the initial pulsing or cycling of the compressor 16, the air conditioner 10 is operated according to the normal control logic of FIG. 4.

Referring initially to the initialization logic of FIG. 6, basically, the initialization control logic of FIG. 6 is identical to the initialization control logic of FIG. 2, except that additional steps have been added such that pulsing of the compressor 16 between ON and OFF operating states only occurs when the engine 12 is cold and when there is a possibility of liquid refrigerant accumulating in the compressor 16. Thus, during initialization, when the engine is cold (i.e., Tw<EC1), the computer controller 24 clears the timers (OFFTMR and ONTMR) so that the compressor 16 is cycled or pulsed at least once before conducting the normal control logic of FIG. 4. However, if the engine is hot (i.e., Tw>EC1), then the computer controller 24 sets the timers such that the pulsing of the compressor 16 does not occur (i.e., OFFTMR>F1 and ONTMR>N1) and the normal control logic of FIG. 4 is immediately used when the air conditioner 10 is turned ON.

Specifically, in step S32, the computer controller 24 measures engine coolant temperature Tw to determine the current temperature of the engine 12. More specifically, the engine coolant temperature sensor 36 sends a signal to the computer controller 24 that is indicative of the coolant temperature of the engine 12.

Then in step S37, the computer controller 24 determines if the engine coolant temperature Tw has fallen below a prescribed engine coolant temperature EC1. In other words, the computer controller 24 is determining whether the engine temperature Tw has fallen below a temperature in which there is a probability that a liquid refrigerant has accumulated in the compressor 16. If the computer controller 24 determines that the engine coolant temperature Tw has fallen below the prescribed engine coolant temperature EC1, then the computer controller 24 proceeds to step S33. However, if the engine coolant temperature Tw has not fallen below the prescribed coolant temperature EC1, then the computer controller proceeds to step S38.

In step S38, the computer controller 24 sets the elapsed time OFFTMR counted by the OFF timer to a value that is greater than the prescribed time F1. Thus, the computer controller 24 effectively deactivates the OFF timer in step S38. The computer controller 24 then proceeds to step S39.

In step S39, the computer controller 24 sets the elapsed time ONTMR counted by the ON timer to a value that is greater than the prescribed time N1. Thus, the computer controller 24 effectively deactivates the ON timer such that the compressor 16 is not pulsed between the ON and OFF operating states when the engine coolant temperature Tw is greater than the prescribed engine coolant temperature EC1.

When the computer controller 24 is utilizing the one time pulse control logic of FIG. 7, then the compressor 16 is cycled between ON and OFF operating states only the very first time the air conditioner 10 is operated. In other words, when the compressor 16 cycles between ON and OFF operating states during normal operation, the compressor 16 is not pulsed between ON and OFF operating states for the purpose of reducing noise as in the prior embodiment. This is because the elapsed times ONTMR and OFFTMR counted by the ON timer and OFF timer, respectively, are not cleared until the engine 12 has been restarted.

In step S41, the computer controller 24 executes normal control logic to set the compressor request flag CompReq to "1", or "0" as explained above with reference to FIG. 4.

In step S42, the computer controller 24 is configured to determine if the compressor request flag CompReq is set to the ON operating state (CompReq="1") or if the compressor request flag CompReq is set to the OFF operating state (CompReq="0"). If the compressor request flag CompReq is set to "0", then the control process proceeds to step S43, because the operation of the compressor 16 is not necessary at this time.

In step S43, the computer controller 24 turns OFF the compressor 16 if the compressor 16 is not already in the OFF operating state.

However, in step S42, if the compressor request flag CompReq is set to "1", then there is a compressor request to turn ON the compressor 16 to cool down the evaporator 14. Thus, the computer controller 24 proceeds to step S44.

In step S44, the computer controller 24 is configured to determine if a prescribed amount of time N1 has elapsed since the compressor 16 has been activated. In other words, in step S44, the computer controller 24 determines if the compressor 16 has been in the ON operating state for the prescribed period of time N1 as measured by the compressor ON timer. In particular, in step S44, the computer controller 24 compares the elapsed time ONTMR counted by the ON timer to the prescribed period of time N1. If the elapsed time ONTMR is set to "0" due to the initialization control logic, then the computer controller 24 will proceed to step S45.

In step S45, the computer controller 24 increments the elapsed time ONTMR by a predetermined amount. Preferably, the value of the prescribed period of time N1 is directly correlated to the processing time to run the full time control logic.

Once the elapsed time ONTMR is incremented in step S45, the computer controller 24 proceeds to step S46. In step S46, the compressor 16 is turned ON. In particular, the compressor 16 includes an electromagnetic clutch that is engaged by the computer controller 24 to operate the compressor 16.

The processing by the computer controller 24 returns to the beginning of this main routine such that the computer controller 24 continues to execute steps S41, S42, S44, S45, and S46 until the elapsed time ONTMR has been incremented such that the prescribed period of time N1 has elapsed. In other words, the computer controller 24 determines in step S44 that the elapsed time ONTMR counted by the ON timer has exceeded the prescribed period of time N1. Thus, the computer controller 24 proceeds to step S47.

In step S47, the computer controller 24 determines if the elapsed time OFFTMR counted by the compressor OFF timer has reached or exceeded a prescribed amount of time, i.e., if a prescribed amount of time F1 has elapsed since the compressor 16 has been turned OFF. If the elapsed time OFFTMR is set to "0" by step S33 of the initialization control logic before the compressor 16 is first started, then the computer controller 24 proceeds to step S48.

In step S48, the computer controller 24 increments the elapsed time OFFTMR by a prescribed amount of time. Similar to the incrementing of the elapsed time ONTMR, the prescribed amount of time for incrementing the elapsed time OFFTMR counted by the OFF timer is preferably based on the execution time of the computer controller 24 to complete a complete loop from the prior comparison between the elapsed time OFFTMR counted by the elapsed time OFFTMR and the prescribed amount of time F1 in step S18.

Once the elapsed time OFFTMR has been incremented in step S48, the computer controller 24 proceeds to step S43 to deactivate the compressor 16 if it has not already been deactivated. Accordingly, the computer controller 24 continuously executes steps S41, S42, S44, S47, S48 and S49, until the elapsed time OFFTMR exceeds the prescribed amount of time F1. If the elapsed time OFFTMR exceeds the prescribed amount of time F1, then the computer controller 24 proceeds to step S46, where the computer controller 24 activates the compressor 16.

Once both the elapsed time ONTMR exceeds the prescribed amount of N1 and the elapsed time OFFTMR exceeds the prescribed amount of F1, then the compressor 16 runs continuously until the evaporator temperature Te of the evaporator 14 exceeds a predetermined threshold for cooling the vehicle cabin. More particularly, the control logic shown in FIG. 4 is continuously executed so long as the air conditioner remains ON.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle air conditioner comprising:
an engine;
a heat removal device configured to receive a refrigerant in a compressed state and remove heat from at least a portion of the refrigerant;
an evaporator in fluid communication with the heat removal device to receive the refrigerant, and configured to evaporate at least a portion of the refrigerant;
a compressor in fluid communication with the evaporator, and configured to compress the refrigerant and deliver the refrigerant in the compressed state to the heat removal device;
operator controls that are manually operated to switch the vehicle air conditioner between an OFF state and an ON state; and
a controller operatively coupled to the compressor to selectively operate the compressor such that with the engine continuously running while switching between the OFF state and the ON state, each time the vehicle air conditioner is manually switched from the OFF state to the ON state the controller operates the compressor initially in an initialization operation mode to decrease slugging at compressor start up and thereafter operates the compressor in a normal operation mode where the compressor is cycled sufficiently to provide cooling at the evaporator until a selected temperature range is reached by the vehicle air conditioner, wherein in the initialization operation mode the controller is programmed to cycle the compressor between an ON operating state for a period of time of no more than four seconds and an OFF operating state for a prescribed period of time insufficient to provide cooling at the evaporator of no more than four seconds.

2. The vehicle air conditioner according to claim 1, wherein
in the initialization operation mode the period of time the compressor is in the ON operating state is approximately one second.

3. The vehicle air conditioner according to claim 2, wherein
the prescribed period of time of the OFF operating state is approximately one second.

4. The vehicle air conditioner according to claim 1, wherein
the prescribed period of time of the OFF operating state is approximately one second.

5. The vehicle air conditioner according to claim 1, wherein
the operating of the compressor between the ON and OFF operating states in the initialization operation mode to decrease slugging is such that the period of time and the prescribed period of time combined are no longer than four seconds.

6. A method of operating a vehicle air conditioner comprising:
operating a vehicle engine that provides power to the vehicle air conditioner;
manually operating controls that switch the vehicle air conditioner between an OFF state and an ON state;
controlling the compressor such that with the engine continuously running while switching between the OFF state and the ON state, each time the vehicle air conditioner is manually switched from the OFF state to the ON state the compressor is operated in an initialization operation mode to decrease slugging at compressor start up between at least one ON operating state for a period of time insufficient to provide cooling by the vehicle air conditioner of no more than four seconds and at least one OFF operating state, for a prescribed period of time of no more than four seconds and thereafter the compressor is operated in a normal operation mode where the compressor is cycled until a selected temperature range is reached by the air conditioner.

7. The vehicle air conditioner according to claim 1, wherein
the operating of the compressor between the ON and OFF operating states in the initialization operation mode to decrease slugging is such that the period of time and the prescribed period of time combined are no longer than four seconds.

8. A vehicle air conditioner comprising:
an engine;
a sensor coupled to the engine that detects an engine operating condition;
a heat removal device configured to receive a refrigerant in a compressed state and remove heat from at least a portion of the refrigerant;
an evaporator in fluid communication with the heat removal device to receive the refrigerant, and configured to evaporate at least a portion of the refrigerant;
a compressor in fluid communication with the evaporator, and configured to compress the refrigerant and deliver the refrigerant in the compressed state to the heat removal device;
operator controls that are manually operated to switch the vehicle air conditioner between an OFF state and an ON state; and
a controller operatively coupled to the compressor to selectively operate the compressor such that with the engine continuously running while switching between the OFF state and the ON state, in response to the vehicle air conditioner being manually switched from the OFF state to the ON state and the sensor detecting the predetermined engine operating condition, the controller operates the compressor in an initialization operation mode to decrease slugging at compressor start up and thereafter operates the compressor in a normal operation mode until a selected temperature range is reached by the vehicle air conditioner, and
in response to the vehicle air conditioner being manually switched from the OFF state to the ON state and the sensor failing to detect the predetermined engine operating condition, the controller operates the vehicle air conditioner only in the normal operation mode,
wherein in the initialization operation mode the controller is programmed to cycle the compressor between an ON operating state for a period of time of no more than four seconds and an OFF operating state for a prescribed period of time insufficient to provide cooling at the evaporator of no more than four seconds.

9. The vehicle air conditioner according to claim 8, wherein
the predetermined engine operating condition is engine temperature being below a prescribed temperature.

10. The vehicle air conditioner according to claim 9, wherein
the controller is programmed to determine the engine temperature based on signals from the sensor detecting engine coolant temperature.

11. The vehicle air conditioner according to claim 8, wherein
the prescribed period of time of the at least one OFF operating state is approximately one second.

12. The vehicle air conditioner according to claim 11, wherein
the controller is further programmed to maintain the compressor in the ON operating state for approximately one second.

13. The vehicle air conditioner according to claim 8, wherein
the controller is further programmed to maintain the compressor in the ON operating state for approximately one second.

* * * * *